United States Patent

[11] 3,625,509

[72] Inventor Clayton C. Claybourn
Northbrook, Ill.
[21] Appl. No. 86,188
[22] Filed Nov. 2, 1970
[45] Patented Dec. 7, 1971
[73] Assignee North American Rockwell Corporation
Pittsburgh, Pa.

[54] CALIPER MECHANISM FOR LAPPED SHEETS
FED TO A PRINTING PRESS OR THE LIKE
20 Claims, 10 Drawing Figs.
[52] U.S. Cl. .................................................. 271/57,
192/127, 226/45, 340/259
[51] Int. Cl. ...................................................... B65h 43/04
[50] Field of Search ........................................ 271/47, 57,
56; 192/127, 126; 33/147 B, 147 L, 147 N, 143 L,
148 H, 172 E; 340/259; 226/45

[56] References Cited
UNITED STATES PATENTS
1,515,774  11/1924  Jones ............................  271/47
3,228,681  1/1966   Williams et al. .............  271/57
3,516,513  6/1970   Robertson et al. ...........  182/19
FOREIGN PATENTS
508,786    6/1939   Great Britain ................  271/57

Primary Examiner—Joseph Wegbreit
Assistant Examiner—Bruce H. Stoner, Jr.
Attorney—Wolfe, Hubbard, Leydig, Voit & Osann ABSTRACT: A caliper mechanism for lapped sheets which uses, as a sensor, a chamber filled with conducting liquid and enclosed by a diaphragm which is acted upon by roller riding on the moving sheets. Extending from the chamber is a neck having a contact at its upper end, the cross section of the neck being only a small fraction of the area of the diaphragm so that as the roller rises a column of liquid rises in the neck at an amplified rate for making of contact. An individual sensing mechanism is distinguished by use of a cylindrical mount which is secured to supporting framework and which, in turn, serves to support a cylindrical sensing unit, the members being threadedly telescoped together to permit separate adjustment of normal roller position and the roller displacement necessary to cause contact. In the preferred construction two such mechanisms are coupled to separate rollers arranged end-to-end, each mechanism having a series of contacts at progressively higher level. Corresponding contacts in the two units are connected, as pairs, to output signal lines by logic circuitry so arranged that no signal is produced as long as the rollers occupy substantially the same level within the range of maximum anticipated thickness. At the end of each series is a final contact which bypasses the logic circuitry and which is capable of producing a signal for stopping the conveyor when the maximum anticipated thickness is exceeded.

INVENTOR
CARLTON C. CLAYBOURN
by: Wolfe, Hubbard, Leydig, Voit & Osann
ATTYS.

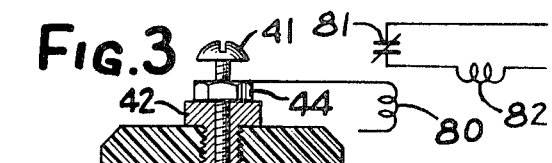
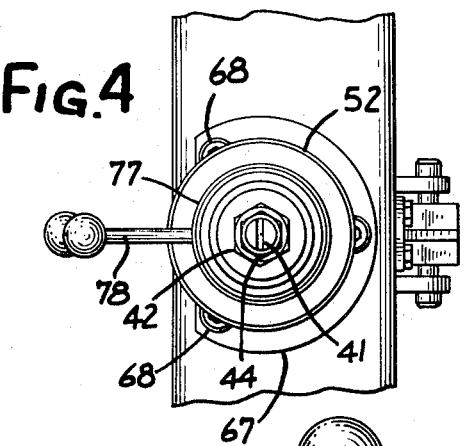
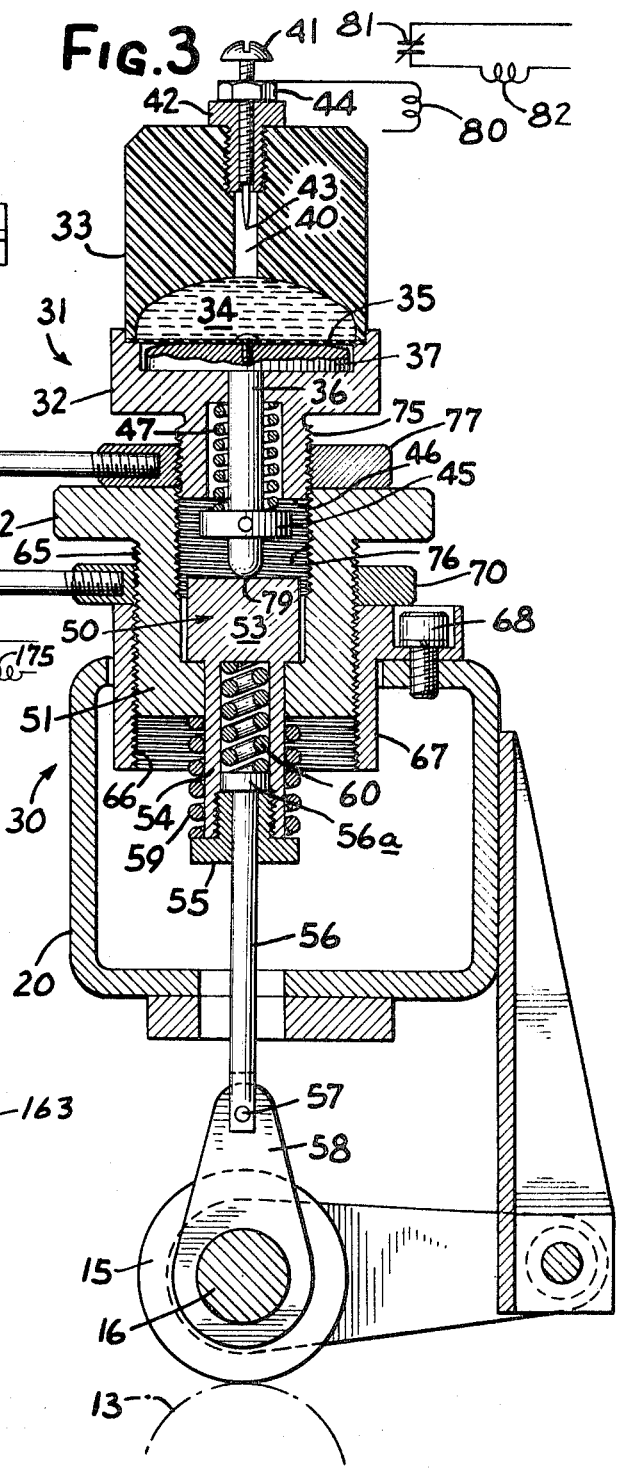
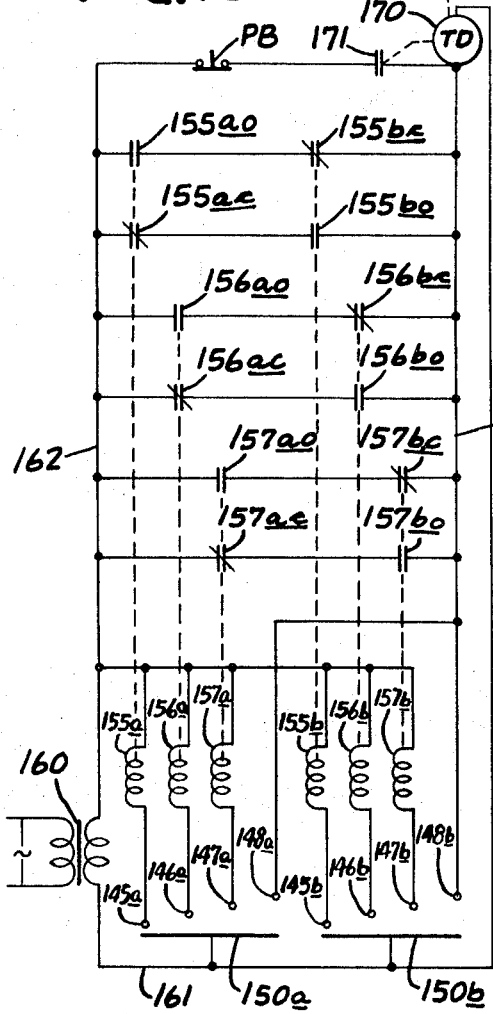

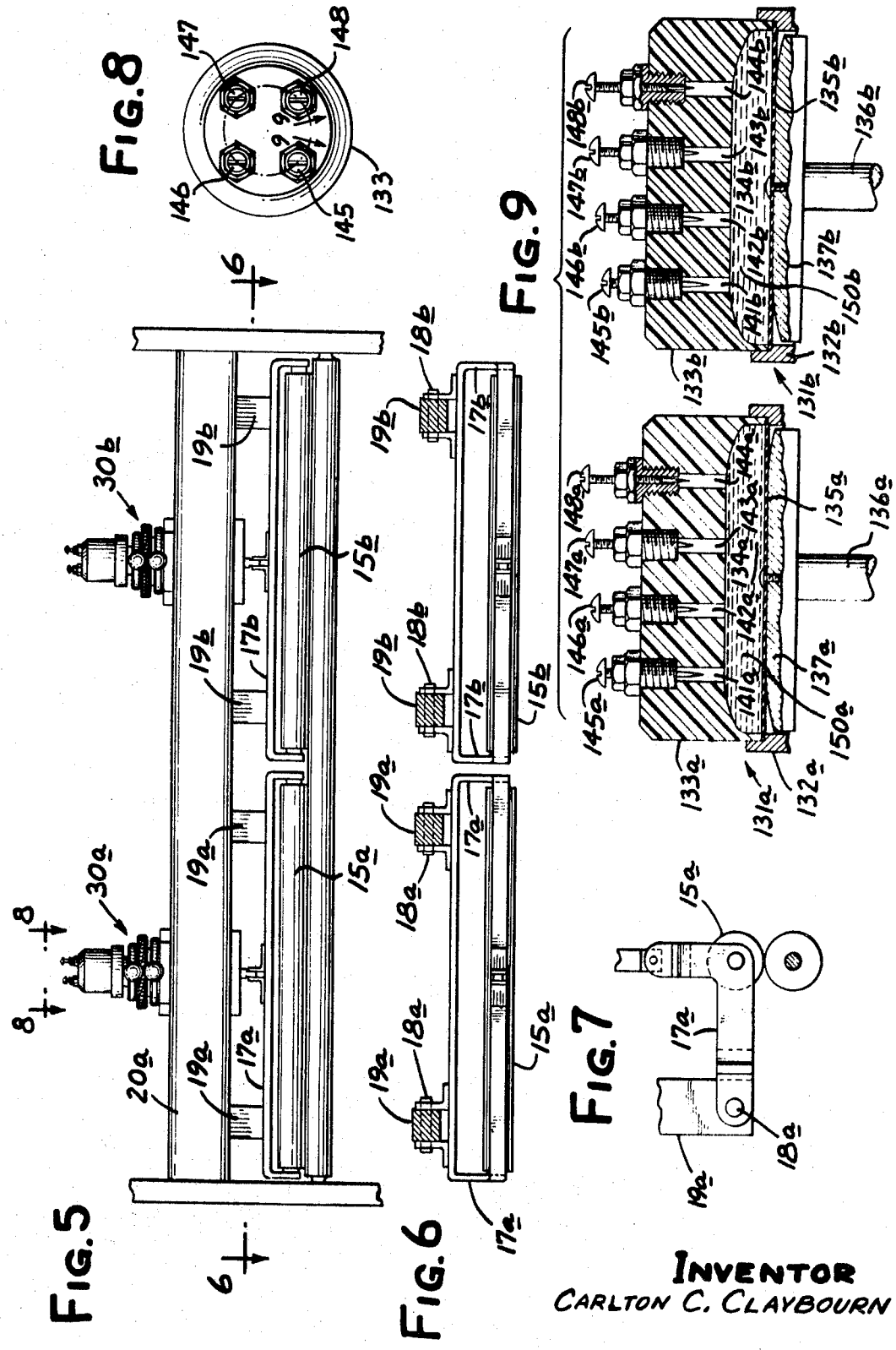

CALIPER MECHANISM FOR LAPPED SHEETS FED TO A PRINTING PRESS OR THE LIKE

In the supplying of sheets of paper to a sheet-fed printing press it is common to cut sheets from a continuous web, the severed sheets being then deposited upon a conveyor to form a stream of overlapping sheets which are turned over to become a stream of underlapping sheets for feeding directly to the press. Experience shows that the stream of lapped sheets will include sheets of irregular length, sheets which are folded, sheets having turned corners, which are misaligned, or sheets which have between them lumps of foreign matter. Moreover, sheets may be fed in double thickness. It is essential that all such defects be detected, and corrected, before they reach the press and cause damage.

The problem of detection is complicated by the overlapping; the thickness of the stream, as it passes under the roller, is not constant but varies cyclically in accordance with the degree of overlap. Thus, the actual thickness at any given point is not as significant as whether the total anticipated thickness has been exceeded or the fact that there is variation in thickness as measured transversely of the direction of flow.

Devices have been produced for many years for monitoring a stream of sheets and for stopping the conveyor upon encountering unusual thickness. Moreover, devices have been proposed for detecting the condition of differential thickness at points spaced transversely of the direction of flow. However, such devices have, for the most part, required complex mechanical linkages including long and relatively flimsy levers which are easily bumped out of adjustment and which are expensive to construct, install, and maintain. Moreover, prior mechanisms employing mechanical linkages have been subject to inertial forces and have been usable only for relatively thick sheets. They have not been capable, for example, of reliably distinguishing between three sheets having a total thickness of 0.006 inch and four sheets having a total thickness of 0.008 inch. Reliability suffers especially at high production rates where inertial forces are more pronounced.

It is, accordingly, an object of the present invention to provide a caliper for a stream of lapped sheets which is reliable and positive in operation even where used with thin sheets transported at a high rate of speed. Thus, it is an object to provide a caliper for lapped sheets which, though highly sensitive, is nevertheless stable and largely freely of inertial effects to minimize the possibility that the conveyor, and press being fed, may be shut down unnecessarily.

It is another object of the present invention to provide a caliper for a stream of lapped sheets which avoids the exposed mechanical linkages formerly used in this type of device and their susceptibility to damage upon inadvertent bumping by a pressman as he carries out his duties. It is, more specifically, an object to provide a caliper which is compact and self-contained, which avoids use of mechanical levers or linkages, which has a minimum of moving parts and which is not only sensitive but rapidly responsive to changes in thickness as the sheets are fed at a high production rate. It is another and related object of the present invention to provide a caliper which is immune to accidental damage including that which might result from excessive movement of the calipering rollers.

It is yet another object of the present invention to provide a caliper mechanism which employs a pair of calipering devices which are coupled to rollers arranged end to end and which is distinguished by sets of progressive contacts with associated logic circuitry so that an output signal is produced only when a differential thickness exists across the width of the stream or when the thickness at any point in the stream exceeds a predetermined maximum value.

It is yet another object of the invention to provide a caliper mechanism which is capable of handling thin sheets with any degree of overlapping, which may be easily and quickly adjusted to existing conditions, in which the adjustment, once made, is accurately maintained until an intentional change is made in the operating conditions, and which requires substantially no maintenance.

The other objects and advantages of the invention will become apparent when reading the attached detailed description and upon reference to the drawings, in which:

FIG. 3 is a vertical enlarged section taken along the line 3—3 in FIG. 1;

FIG. 4 is a top view of the device shown in FIGS. 1–3;

FIG. 5 is a front view, similar to FIG. 1, but showing a modified and preferred form of the present invention;

FIG. 6 is a fragmentary plan view looking along the line 6—6 in FIG. 5;

FIG. 7 is a side view corresponding to FIGS. 5 and 6;

FIG. 8 is a top view of a sensing unit used in the modification of FIG. 5 and looking along the line 8—8 in that FIG;

FIG. 9 is a developed sectional view looking along the line 8—8 in FIG. 5 and showing use of a plurality of adjustable contact used in the two sensors; and, FIG. 10 is a schematic diagram showing the output circuit and the logic circuitry which forms a part thereof.

While the invention has been described in connection with certain preferred embodiments, it will be understood that I do not intend to be limited to the particular embodiments shown but that I intend, on the contrary, to cover the various alternative and equivalent constructions included within the spirit and scope of the appended claims.

Figure 1:
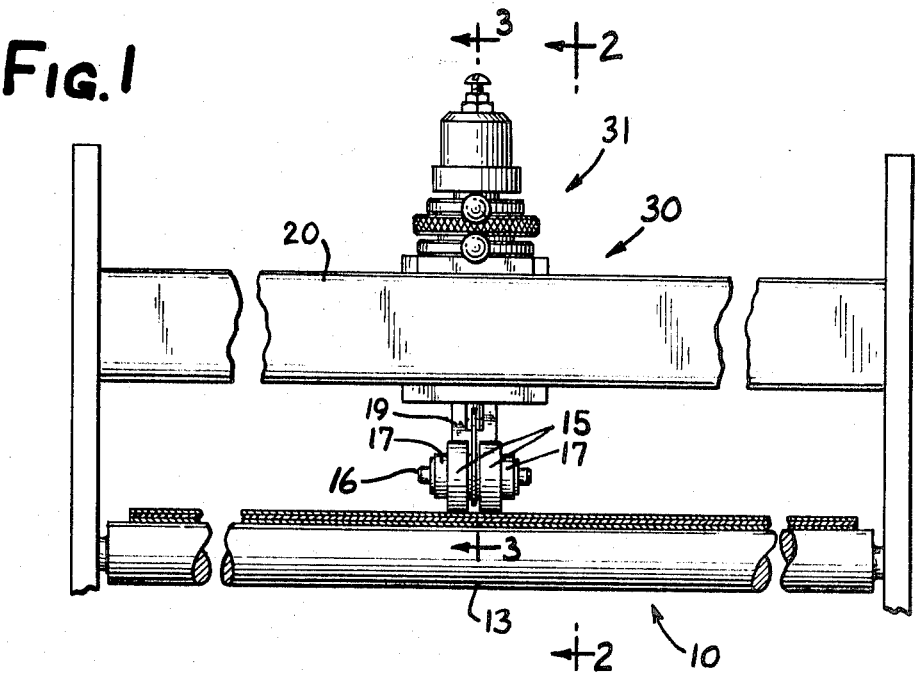
FIG. 1 is a front elevation of a simple form of calipering installation constructed in accordance with the present invention.
Figure 2:
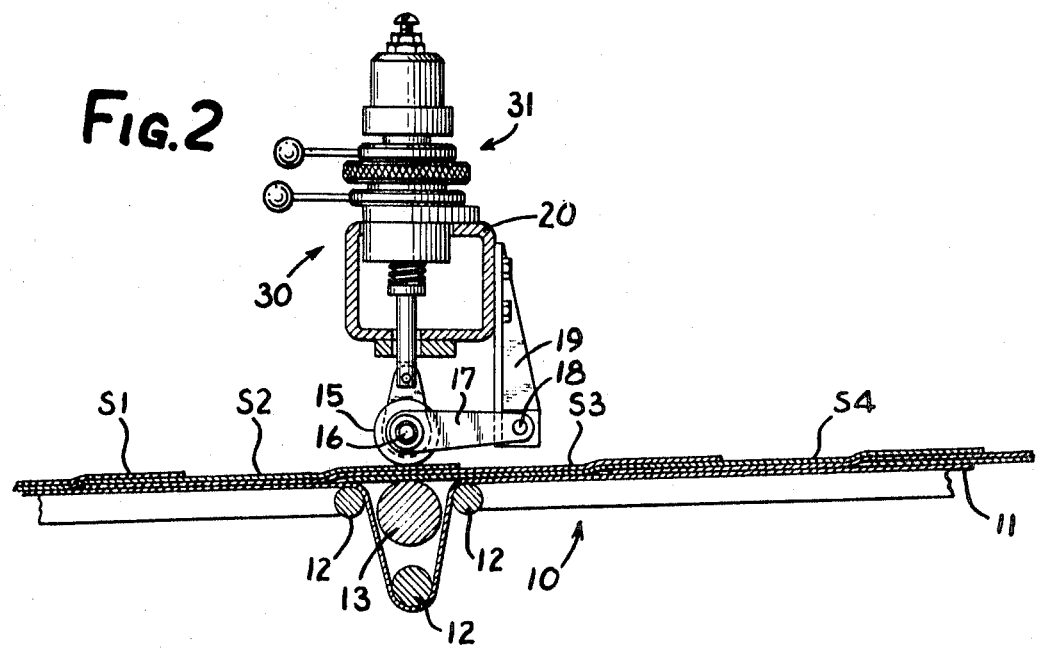
FIG. 2 is a side view of the mechanism shown in FIG. 1 looking along the line 2—2 and with the transverse frame member in cross section.

Turning now to FIGS. 1 and 2, there is disclosed a conveyor 10 having a belt 11 which carries an underlapped stream of sheets indicated at S1–S4 and which are exaggerated in thickness for the sake of illustration. The conveyor belt 11, is at a reference position, diverted, or offset, by a group of pulleys 12 for accommodation of a lower caliper roller 13, the upper surface of which serves as a reference for gaging of thickness. Aligned above the roller 13 is an upper calipering, or sensing, roller 15 having two portions pinned at 16 for vertical swinging movement upon a horizontal supporting arm 17 (FIG. 2). The latter is pivoted at 18 to a depending bracket 19 which is secured to a transverse hollow frame member 20.

In accordance with the present invention, a sensing assembly for sensing movement of the calipering roller 15 is provided which includes a liquid chamber having an upwardly extending neck portion and enclosed, at the bottom, by a diaphragm which is connected, by means of a plunger, to the calipering roller. A contact is mounted in the neck and the neck is of a cross-sectional area which is only a small fraction of the area of the diaphragm so that when the roller moves upwardly a column of the liquid is forced upwardly in the neck at an amplified rate for engaging the contact whenever an unusual thickness is encountered. Thus, referring particularly to FIG. 3, a caliper device 30 is provided having a sensing assembly 31 formed of a cylindrical base 32 and a superimposed housing or cap 33 which is preferably formed of insulating material and which is hollowed out to form a fluid chamber 34. The lower wall of the chamber 34 is defined by a flexible diaphragm 35, the peripheral edge of which is firmly anchored between the presented edges of the members 32, 33 as shown. Extending downwardly from the diaphragm is a plunger 36 fitted with a disc-shaped head 37 which underlies the diaphragm and which is secured to it. Means, to be discussed, are provided for coupling the plunger 36 to the roller 15 so that the diaphragm is moved upwardly and downwardly in accordance with the vertical movements of the roller as different thicknesses are encountered.

Communicating with the chamber 34 and extending upwardly from it is a narrow neck portion or passage 40 having a cross-sectional area which is only a fraction of the area of the diaphragm so that when the diaphragm is raised, the liquid rises in the neck at an amplified rate. For making electrical contact when the liquid rises to a predetermined level, a contact screw 41 is provided which is threaded into an insert 42 and which presents a pointed tip 43. After the tip 43 is set at the desired height the adjustment is maintained by tightening a clamping nut 44.

In order to prevent damage to the sensing assembly as a result of excess upward movement of the plunger 36, the lower end of the plunger is provided with a stop in the form of a collar 45 which engages a downwardly presented stop surface 46 on the member 32. The diaphragm 35 and plunger 36 are maintained in a normally bottomed condition by means of a coil spring 47 which exerts a downward force against the collar 45, the disc-shaped head 37 serving as a stop in the downward direction.

In order to transmit the movement of the roller 15 to the lower end of the plunger 36, a lower plunger is provided arranged coaxially end to end and which extends downwardly to a captive connection with the roller. This lower plunger, indicated at 50, is mounted for sliding movement in a cylindrical mount 51 having a flange 52. The plunger 50 has a head portion 53 and a hollow shank portion 54 which is enclosed, at its lower end, by a threaded ferrule 55. Mounted in the ferrule is a plunger extension 56 which is pivoted at pivot 57, at its lower end, which is secured to the shaft 16 upon which the roller 15 is mounted. The lower plunger 50 is maintained extended downwardly, in bottomed condition, by a coil spring 59 which presses against a flange formed integrally with the ferrule 55.

In order to permit the plunger assembly to yield endwise for safety's sake, in the face of any excessive upward movement of the roller 15, a yieldable joint is provided between the plunger member 50 and the downwardly extending member 56. Such a yieldable joint is formed by a stiff coil spring 60 which is included within the hollow shank 54 and which presses against the head 56a of the member 56. Thus, in the face of all normally imposed forces or roller displacements, the plunger members 50, 56 remain stiffly bottomed with respect to one another with the spring 60 in its extended position. However, upon excess upward displacement of the roller, and with the plunger members 36, 50 being blocked against further movement, compression of the spring 60 occurs permitting upward movement of the member 56 to accommodate the roller movement.

In order to adjust the normal position of the roller, the mount 51 is externally threaded for reception in a threaded hollow receiver which is secured to the transverse frame member 20. Thus, as shown in FIG. 3, the member 51 has an external thread 65 which screws into an internal thread 66 formed in the hollow receiver 67 which is firmly secured to the hollow frame member 20 by means of cap screws 68 or the like. Where it is desired to support the upper caliper roller 15 in direct contact with the lower caliper roller 13 to establish an initial position for the roller 15, the mount 51 is rotated by the flange 52 at its upper end, the mount 51 being turned clockwise until the roller 15 just makes contact. At this point the mount 51 may be clamped in place within its receiver 67 by means of a clamping nut 70 having an operating arm 71.

For the purpose of adjusting the sensing assembly so as to produce a predetermined displacement of the liquid in chamber 34 in response to a predetermined upward displacement of the roller 15, the base 32 of the sensing assembly, which is of cylindrical shape, is externally threaded at 75 for telescoped screwing into an internal thread 76 formed concentrically within the mount 51. In adjusting this threaded connection, a calibrating shim representing the maximum tolerable thickness of the sheet may be inserted between the lower and upper rollers 13, 15. Following this the sensing assembly may be screwed downwardly into the mount 51 until the upper plunger 36, bottoming against the lower plunger member 50, raises the diaphragm so that the liquid is forced well up into the narrow neck portion. In the event that a fixed contact is used, the sensing assembly may be screwed in until the liquid engages the contact to close an electrical circuit, following which the sensing assembly may be backed of slightly. It may then be clamped in position, relative to the mount 51, by a clamping nut 77 having a handle 78. In the preferred embodiment, using an adjustable contact, the sensing assembly may be screwed in until contact is achieved and then clamped in place by the nut 77. As a final step the contact screw 41 may be backed off slightly and then clamped in position by clamping 44. It will be apparent, then, that adjusting the displacement of the upper caliper roller required to produce electrical contact is a matter of making two coordinated adjustments, the bodily adjustment of the sensing assembly and the adjustment of the contact screw. Since the roller displacement for lapped sheets of conventional thickness will be exceedingly small, the sensing assembly is preferably adjusted, with respect to the mount 51, so that contact with the lower plunger is achieved, under initial conditions, at point 79 at the lower end of the plunger 36. Thus, any upward movement of the roller 15 is immediately accompanied by proportional upward movement of the conducting fluid in the neck 40, with the adjustment of the contact screw 41 determining when contact, as a function of roller displacement, will take place. However, where larger amounts of roller displacement will normally occur, for example, in the calipering of heavy-gage paper or cardboard, the sensing assembly may be adjusted by backing off so that there is separation at point 79 under the initial condition. Where such separation is utilized, it will only be the final portion of the roller movement, following bottom at point 79, which will cause rising of the liquid in the neck. In this way high sensitivity and accuracy may be preserved even when dealing with relatively thick sheet material.

When using the simplified form of the invention, with a single detecting contact a simple output circuit suffices. Such output circuit may, for example, include a relay 80 having a normally closed contact 81 which is in series with the winding of the existing trip solenoid 82 forming a part of the regular conveyor and press control circuit. Thus, when contact is made and the relay coil 80 is energized, the normally closed contact 81 opens thus permitting the trip solenoid 82 to drop out to turn off the conveyor and stop the feed.

It will be apparent that this detecting arrangement, even in its simplified form, carries out many of the objects of the present invention. It is sensitive to small roller displacements since the cross-sectional area of the neck 40 is many times smaller than the area of the diaphragm 35 to which the roller 15 is connected, thus giving a high amplification ratio. Stated in practical terms, movement of the roller through 0.002 inch, corresponding to the thickness of a thin sheet of paper, and which imparts the same displacement to the diaphragm 35, is effective to cause a rise in the liquid column through a much greater distance. When the area ratio is, say 100, the column of liquid will rise in the neck 0.2 inch. To detect the double thickness condition, the screw 41 may be set to product contact at 0.4 inch above the reference level, providing a range which insures against spurious contact.

Since the mechanism is almost entirely self-contained it is not subject to bumping or mechanical damage during the normal activity of the operator of the conveyor and press. Nor is it possible for the device to damage itself as a result of extreme roller displacement. Upward movement of the plunger 36 will occur until the collar 45 bottoms on the stop surface 46 to protect the diaphragm and to prevent build up of pressure within the space 34. The amount of endwise movement which may be undergone by the plunger element 50 before bottoming of the spring 59 occurs may be tailored to approximate the range of available movement of the plunger 36. Any tendency for the lower plunger rod 56 to move beyond this point is accommodated by yielding of the safety spring 60 which permits relative movement between the members 50, 56 as may necessary. The only exposed moveable part is the lower end of the plunger extension 56 which is, moreover, largely shielded in the hollow frame member 20. This is to be contrasted with the long, exposed, and hence vulnerable, levers used in prior attempts to secure a high amplification factor.

With the construction and operational features of the above simplified version of the present invention fully in mind, attention may now be given to a more sophisticated and preferred version set forth in FIGS. 5 to 10 inclusive. In accordance with this aspect of the invention, two separate sensing units are provided similar in construction to the units set forth in FIG. 3 and coupled to separate caliper rollers arranged end to end transversely of the direction of sheet movement, each of the sensing units having a progressive series of contacts arranged at increasing level and with logic circuitry being interposed between the contacts and the output circuit so that when the two rollers are raised substantially in step with one another, upon traversal of a stream of lapped sheets, no output signal is produced, but when one of the rollers is raised to a different degree than the other, indicating the presence of a thickness anomaly on one side of the sheet, a signal is given to shut down the conveyor. Further in accordance with the invention, a final or high-level contact is provided in the series which bypasses the logic circuitry so that upon achieving a displacement beyond that which is anticipated by either one or both of the caliper rollers, a signal is produced to shut down the conveyor. Turning to FIGS. 5–9 inclusive, since the two adjacent installations are substantially identical to one another and to the embodiment previously described, corresponding reference numerals, with the addition of subscripts $a$ or $b$ as appropriate, have been used to indicate corresponding parts. Separate caliper mechanisms 30a, 30b are provided under the control of rollers 15a, 15b which are arranged end to end transversely with respect to the direction of sheet movement. The rollers are mounted on arms 17a, 17b pivoted on horizontal pins 18a, 18b which are supported in brackets 19a, 19b, respectively.

The sensing assembly 131a (FIG. 9) is specifically different from that earlier disclosed, having a base 132a and a cap 133a defining a central chamber 134a which is enclosed, at the bottom, by a diaphragm 135a supported on a plunger disc 137a forming part of plunger 136a. In this embodiment the neck portion which communicates with the chamber 134 is made up of four separate necks 141a–144a, having individual adjustable contacts 145a–148a, respectively. The necks are preferably located in a symmetrical four-sided cluster as shown in FIG. 8. Upon upward movement of the diaphragm 135a, a column of conductive liquid rises in the same way in each, since each neck is of the same diameter and equally accessible to the body of the liquid. Thus, as the diaphragm 135a moves upwardly, the contacts are progressively engaged. The contact 145a may, for example, be adjusted so that contact is made when one thickness of paper is under the roller. Contact 146a may be adjusted for two thicknesses and 147a adjusted for three. All of these thicknesses are within the normally expected range of thickness assuming overlap in accordance with the pattern of FIG. 2. The high-level contact 148a is adjusted to produce contact when the total thickness, detected by the associated roller, exceeds the maximum expected; for example, contact 148a may be adjusted to close the circuit when any thickness substantially over that corresponding to three sheets is encountered.

In carrying out the present invention the sensing assembly of the caliper unit 30b is provided with the same number of contacts similarly arranged and similarly adjusted. As shown in the right-hand portion of FIG. 9, the second sensing assembly is indicated at 131b, and corresponding numerals with subscript $b$ are used to denote corresponding parts.

Thus, contacts 145a, 145b are adjusted to similar height and correspond to one another, the same is true for contacts 146a, 146b and 147a, 147b. The body of conductive liquid in each of the devices, forming the other side of the switch, has been identified for convenience as contacts 150a, 150b.

In accordance with one aspect of the invention, logic circuitry is provided so that simultaneous making of the paired contacts 145a, 145b, etc., denoting a completely symmetrical state, will be considered a perfectly safe condition and one not to produce an output signal, whereas the making of one contact of the pair, but not the other, will be understood to denote a nonsymmetrical condition for the purpose of producing an output signal for sounding of an alarm for automatic shutdown of the conveyor. The logic circuitry, is in the form of magnetic relays connected to each of the progressive level contacts except the last in the series, each of the relays having a normally open and normally closed contacts and with the normally opened contact of one relay being connected in series with the normally closed contact of the relay of the paired level contact.

Referring to FIG. 10, the circuit includes a transformer 160 connected to the regular AC supply and having voltage lines 161, 162 and a switched or output line 163. The lowest level contact 145a, which is engaged first by the body liquid 150a, has, connected in series, the winding of a relay 155a having a normal open contact 155ao and a normally closed circuit contact 155ac. The corresponding lowest level contact 145b in the second sensing assembly, indicated at 145b, is connected to a relay 155b having a normally closed contact 155bc and a normally open contact 155bo. The normally open and normally closed contacts of the respective relays are, as shown, connected in series from the voltage line 162 to the switched line 163.

Similarly, relays 156a, 157a, 157b are connected to terminals at successively higher level, all of the relays being provided with the normally open and normally closed contacts designated by the suffix "o" and "c" and connected as shown, the normally open contact being connected in series with the normally closed contact on the relay with which it is paired.

For producing an output signal, a time delay relay 170, having a delay time on "make" on the order of 0.005 second is provided, connected from the switched line 163 to the voltage line 161. The time delay relay has a normally open "sealing" contact 171 connected across lines 162–163 in series with a reset pushbutton PB and a normally closed "output" contact 172 which is connected in series with the existing trip solenoid 175. It will be understood that the opening of the circuit of the trip solenoid 175, permitting such solenoid to drop out, is utilized, in the usual way, to disengage the conveyor and press drive, either by deenergizing the drive motor or by deenergizing a clutch connected to the shaft of the drive motor. The normally closed contact is, therefore, analogous to the emergency stop button provided in substantially all commercial press and conveyor drives.

In operation, then, it will be apparent that when the paired level contacts are both engaged by columns of conductive liquid substantially simultaneously, within the range of expected thickness, no output signal results. This may be made clear by assuming that the rollers 15a, 15b are both in current running engagement with two sheet thicknesses, causing simultaneous closing of the level contacts 146a, 146b. This has the effect of opening the normally closed contacts and closing the normally open contacts on each of the two relays 156a, 156b, so that no circuit is made between lines 162, 163, and the time delay relay 170 is not energized. Let it be assumed further that the rollers 15a, 15b simultaneously roll up upon a triple sheet thickness. This causes the making of contacts 147a, 147b in the two sensing assemblies resulting energization of the paired relays simply interchanges the condition of the normally open and normally closed contacts and no circuit is made across the lines 162, 163 so that the time delay relay remains unenergized.

However, suppose that the rollers 15a, 15b because of a skewed sheet, are not simultaneously subjected to three sheet thicknesses. Suppose only two thicknesses exist under the roller 15a while three thicknesses currently exist under the roller 15b. This causes the level contact 147a to be made in advance of the making of the paired contact 147b so that the relay 157a is turned on before the relay 157b. This causes the normally open contact 157ao to be closed at the time that contact 157bc on the paired relay is still closed so that a circuit is completed between the lines 162, 163, thus energizing the lower terminal of the time delay relay 170. After a short time delay this relay closes its sealing contact 171 so that it seals itself in through reset pushbutton PB. At the same time normally closed contact 172 in series with the trip solenoid 175 opens, permitting the latter to drop out and shutting down the conveyor and press.

In the same way any nonsimultaneous making or breaking of the paired level contacts, regardless of the reason for the dissymmetry of the total sheet thickness, will have the effect of energizing the time delay relay 170 to produce closing down of the conveyor drive.

It is one of the features of the present control circuit that a final contact is provided in the level series of each of the sensing assemblies which detects excessive thickness engaged by either or both of the caliper rollers 15a, 15b. In order to bypass the logic circuit and to enable such closure, upon excess thickness, to act directly upon the time delay relay 170, relays are omitted in these lines and the final level contacts 148a and 148b are both connected directly as shown, to the lower terminal of the time delay relay. Thus, in the event a small wad of paper becomes lodged between the overlapping sheets to provide a thickness anomaly, this fact is immediately detected by displacement of roller 15a or 15b to produce direct energization of the time delay relay 170, as an incident of which such relay seals itself in and drops out its normally closed contact 171 to deenergize the trip solenoid 175. The circuit is restored by pushing the pushbutton PB to drop out the time delay relay.

While the invention has been described in connection with the use of magnetic relays in the logic circuitry, it will be apparent that the invention is not limited thereto and that the relay means may be in the form of corresponding solid-state logic circuitry without departing from the invention.

It will also be apparent to one skilled in the art that the invention is not limited to the use of any particular conducting liquid. Mercury is, however, preferred. While mercury is a heavy liquid, the necks which enclose the level contacts are of small diameter and the chambers indicated at 34, 134a, 134b, in the drawings may be made relatively thin in vertical dimension so that only a limited total mass of mercury is involved, an amount which is small compared to the effective operating forces.

The term "roller" has been used herein to designate the elements 15, 15a and 15b. While the disclosed structure is preferred for riding upon the top of the sheets, it will be understood that the term "roller" as used herein shall be understood to include, within its scope, any equivalent riding means such as stationary riders having a highly polished, frictionless engaging surface.

The diaphragm 35 may be of any suitable material capable of repeated flexure without breakage or fatigue. When the diaphragm is made of material which is electrically nonconductive, for example rubberlike material or durable plastic, the rivet which secures the diaphragm is made of metal to serve as a conductor to insure that the conductive liquid is electrically grounded. While the term "diaphragm" has been used to described elements 35, 135a and 135b, and while use of diaphragm in the form of a disc is preferred, it will be understood that the term is broad enough to contemplate use of an analogously operating, closely fitted piston without in any way departing from the present invention. Also while the diaphragm is stated to enclose the lower surface of the chamber, it will be understood that the term "lower" is a relative one and that the diaphragm need not be horizontal.

Moreover, while the preferred construction includes level contacts which enter from the upper end of the neck, it will be apparent that the invention is not limited to this particular contact arrangement and that the contacts may be mounted to enter the neck regions from the side rather than from the top. Indeed, while four separate neck portions are shown in FIG. 9, it would be possible, and in some instances practical, to employ but a single neck with four contacts progressively engaged by the rising liquid level.

Also the term "plunger" has been used to designate the means for coupling the diaphragm to the associated roller. As will be clear, the plunger may be a single element, either long or short, or may be, as shown, made up of a composite of several plunger elements that cooperate with one another, end to end, to displace the diaphragm.

While no mention has been made of the provision for venting the neck, or necks, in the disclosed devices to permit rapid rise and fall of conducting liquid, it will be understood that suitable vents may be incorporated, for example, by providing a nonsealing fit between the ferrules which mount the contacts and the surrounding body or cap of insulating material.

What I claim is:

1. In a caliper mechanism for lapped sheets to fed to a printing press or the like, the combination comprising;
    a generally horizontal conveyor for carrying a stream of lapped sheets past a reference position,
    a sensing roller at the reference position guided for up and down movement,
    a plunger coupled to the roller for movement therewith,
    a sensing assembly defining a liquid chamber having an upwardly extending neck portion,
    a diaphragm covering the underside of the chamber, the diaphragm being coupled to the plunger,
    a body of conductive liquid in the chamber,
    an electrical contact at the upper end of the neck portion,
    the cross-sectional area of the neck portion being only a small fraction of the area of the diaphragm so that when the roller moves upwardly by an amount which exceeds the normal thickness of the sheet, a column of the liquid is forced upwardly in the neck portion at an amplified rate for engaging the contact, and
    means for signaling engagement of the contact.

2. The combination as claimed in claim 1 in which the plunger has stops for severely limiting its movement in both directions in the sensing assembly.

3. The combination as claimed in claim 1 in which the plunger has a stop for limiting upward movement of the plunger as well as the diaphragm which is connected to it and in which the plunger has a bottoming-type yieldable connection to permit accommodation to excess upward movement of the roller.

4. The combination as claimed in claim 1 in which lost motion is provided in the plunger thereby to permit movement of the roller through an initial displacement prior to displacement of the liquid.

5. The combination as claimed in claim 1 in which the electrical contact is axially positionable in the neck portion.

6. The combination as claimed in claim 1 in which a plurality of contacts are provided in the neck portion and in which each contact has associated signaling means and is at a different level.

7. In a caliper mechanism for lapped sheets fed to a printing press or the like, the combination comprising;
    a generally horizontal conveyor for carrying a stream of lapped sheets past a reference position,
    a sensing roller at the reference position guided for up and down movement,
    a relatively fixed mount,
    a plunger coupled to the roller for movement therewith relative to the mount,
    a sensing assembly defining a liquid chamber having an upwardly extending neck portion,
    a diaphragm covering the underside of the chamber and coupled to the plunger,
    a body of conductive liquid in the chamber,
    an electrical contact at the upper end of the neck portion,
    the cross-sectional area of the neck portion being only a small fraction of the area of the diaphragm so that when the roller moves upwardly a column of the liquid is forced upwardly in the neck portion for engagement with the contact, and the sensing assembly having a threaded connection with the mount coaxially arranged with respect to the plunger thereby to predetermine the point of making contact as a function of sheet thickness.

8. In a caliper mechanism for lapped sheets fed to a printing press or the like, the combination comprising:
   a generally horizontal conveyor for carrying a stream of lapped sheets past a reference position,
   a frame,
   a sensing roller at the reference position guided for up and down movement with respect the the frame,
   a mount secured to the frame,
   the sensing assembly being secured to the mount,
   the sensing assembly defining a liquid chamber having an upwardly extending neck portion,
   a diaphragm covering the underside of the chamber,
   a body conductive liquid in the chamber,
   an electrical contact at the upper end of the neck portion,
   plunger means extending though the mount into engagement with the diaphragm at its upper end and connected to the roller at its lower end,
   a bottoming stop for limiting the downward extension of the plunger means,
   a threaded connection between the mount and the frame for adjusting the normal position of the roller, and
   a threaded connection between the sensing assembly and the mount for predetermining the degree of movement of the plunger means which is required to produce electrical contact.

9. The combination as claimed in claim 8 in which the plunger means includes a bottoming-type yielding connection for permitting excess roller displacement free of accompanying movement of the plunger.

10. In a caliper mechanism for lapped sheets fed to a printing press or the like, the combination comprising;
   a generally horizontal conveyor for carrying a stream of lapped sheets past a reference position,
   a frame,
   a sensing roller at the reference position guided for up and down movement with respect to the frame,
   a cylindrical mount,
   a lower plunger centered in the mount and connected at its lower end to the sensing roller,
   a cylindrical sensing assembly defining a liquid chamber having an upwardly extending neck portion,
   a diaphragm enclosing the underside of the chamber,
   a body of conductive liquid in the chamber,
   an electrical contact at the upper end of the neck portion,
   an upper plunger axially mounted in the sensing assembly connected to the diaphragm at its upper end and arranged for engagement with the lower plunger at its lower end, each of the plungers having means for urging them downwardly into bottomed condition,
   the mount being telescopingly threaded with respect to the frame for adjustment of the normal position of the roller, and the sensing assembly being telescopingly threaded into the mount for predetermining the amount of roller and plunger movement required for the making of electrical contact, and
   the cross-sectional area of the neck portion being only a small fraction of the area of the diaphragm so that when the roller moves upwardly a column of the liquid is forced upwardly in the neck portion at a rate which is a large multiple of roller movement.

11. The combination as claimed in claim 10 which stops are provided in the sensing assembly for limiting the movement of the upper plunger in each direction and in which stops are provided in the mount for limiting the degree of movement of the lower plunger in each direction, each of the plungers having a spring for urging the same into a bottomed condition.

12. In a caliper mechanism for lapped sheets fed to a printing press or the like, the combination comprising;
   a generally horizontal conveyor for carrying a stream of lapped sheets past a reference position,
   a pair of sensing rollers transversely arranged end to end at the reference position and guided for independent up and down movement in accordance with the thickness of the sheets,
   a pair of sensing assemblies each defining a liquid chamber having an upwardly extending neck portion,
   each chamber having an enclosing diaphragm with the diaphragms being coupled to their respective rollers for movement therewith,
   conductive liquid in the chambers,
   electrical contacts in the respective neck portions, and
   signaling means connected to the contacts and responsive to the making of contact for indicating passage of a localized region of excess sheet thickness.

13. In a caliper mechanism for lapped sheets fed to a printing press or the like, the combination comprising;
   a generally horizontal conveyor for carrying a stream of lapped sheets past a reference position,
   a pair of sensing rollers transversely arranged end to end at the reference position and guided for independent up and down movement in accordance with the thickness of the sheets,
   a pair of sensing assemblies each defining a liquid chamber having an upwardly extending neck portion,
   each chamber having an enclosing diaphragm with the diaphragms being coupled to the respective rollers for movement therewith,
   a body of conductive liquid in each of the chambers,
   electrical contacts at the same relative level in the respective neck portions, and
   signaling means including logic circuitry responsive to the making of one but not both of the electrical contacts to indicate nonsymmetry in the thickness of the portions of the sheets engaged by the respective rollers.

14. The combination as claimed in claim 13 in which relays having normally open and normally closed contacts are connected to the respective electrical contact with the normally open and normally closed contacts of the relays being connected in series with one another across a signaling circuit so that closure of one of the relays without closure of the other produces an output signal.

15. The combination as claimed in claim 14 in which a time delay device is interposed in series with the output circuit so that no output signal is produced except upon sustained closure of only one of the relays for a predetermined minimum time interval.

16. In a caliper mechanism for lapped sheets fed to a printing press or the like, the combination comprising:
   a generally horizontal conveyor for carrying a stream of lapped sheets past a reference position,
   a pair of sensing rollers transversely arranged end to end at the reference position and guided for independent up and down movement in accordance with the thickness of the engaged portions of the sheets,
   a pair of sensing assemblies each defining a liquid chamber having an upwardly extending neck portion,
   each chamber having an enclosing diaphragm with the diaphragms being coupled to the respective rollers for movement therewith,
   bodies of conductive liquid in the chambers,
   each of the neck portions having a series of contacts arranged at progressive increments and positioned for simultaneous respective engagement in pairs when the rollers encounter sheets overlapped to the same total thickness,
   an output circuit, and
   means responsive to the making of one only of a pair of corresponding contacts thereby indicating a condition of nonsymmetry between the condition of the two rollers for the production of an output signal.

17. The combination as claimed in claim 16 in which the series of contacts in each of the neck portions includes an end contact and in which means are provided for producing a signal in the output circuit when either of the end contacts is engaged.

18. In a caliper mechanism for lapped sheets fed to a printing press or the like, the combination comprising:

a generally horizontal conveyor for carrying a stream of lapped sheets past a reference position, a pair of sensing rollers transversely arranged end to end at the reference position and guided for independent up and down movement in accordance with the thickness of the engaged portions of the sheets, a pair of sensing assemblies each defining a liquid chamber having an upwardly extending neck portion including a plurality of necks, each chamber having an enclosing diaphragm with the diaphragms being coupled to the respective rollers for movement therewith, a body of conducting liquid in each of the chambers, the cross-sectional area of the necks being a small fraction of the areas of the diaphragms so that when the rollers move upwardly by an equal amount the columns of liquid in the necks are forced upwardly by an equal amount at an amplified rate, the necks of each sensing assembly having a series of level contacts engageable by the columns of liquid at respectively corresponding elevations indicative of equal sheet thickness, each of the level contacts being connected to a relay being having normally open and normally closed circuits, an output circuit, and the normally open circuit of one relay being connected in series with the normally closed circuit of the corresponding relay across the output circuit so that the output circuit is closed only when the rollers are at a differential level indicating a thickness anomaly in the portion of the sheets engaged by one of the rollers.

19. The combination as claimed in claim 18 in which high-level contacts are provided in each of the necks with each of the high-level contacts being connected directly to the output circuit for closing the output circuit when either one of the two rollers is subjected to excessive displacement.

20. The combination as claimed in claim 19 in which a time delay device is incorporated in the output circuit to provide brief time delay thereby to preclude passage of an output signal in response to transient movements of the rollers.

* * * * *

UNITED STATES PATENT OFFICE
CERTIFICATE OF CORRECTION

Patent No. 3,625,509                       Dated December 7, 1971

Inventor(s) Carlton C. Claybourn

It is certified that error appears in the above-identified patent and that said Letters Patent are hereby corrected as shown below:

Column 2, line 23, change "contact" to read "contacts".

Column 3, line 75, change "of" to read "off".

Column 4, line 28, change "bottom" to read "bottoming";

line 51, change "When" to read "Where";

line 53, change "product" to read "produce";

line 70, after "may" insert ---be---.

Column 6, line line 14, after "body" insert ---of---;

line 25, after "157a" insert ---and 156b,---;

line 60, after "resulting" insert ---in---;

line 61, after "the" (first occurrence) insert ---connected relays 157a, 157b. Again, simultaneous energization of the---.

Column 7, line 58, change "described" to read "describe".

Column 8, line 14, after "sheets" delete "to" (first occurrence).

UNITED STATES PATENT OFFICE
CERTIFICATE OF CORRECTION

Patent No. 3,625,509          Dated  December 7, 1971

Inventor(s)   Carlton C. Claybourn          PAGE - 2

It is certified that error appears in the above-identified patent and that said Letters Patent are hereby corrected as shown below:

Column 9, line 11, after "respect" delete "the" and insert "to";

line 17, after "body" insert ---of---;

Column 10, line 37, change "contact" to read "contacts".

Column 12, line 3, delete "being".

Signed and sealed this 13th day of June 1972.

(SEAL)
Attest:

EDWARD M.FLETCHER,JR.                ROBERT GOTTSCHALK
Attesting Officer                    Commissioner of Patents